US010398971B2

(12) United States Patent
Hotaka

(10) Patent No.: US 10,398,971 B2
(45) Date of Patent: Sep. 3, 2019

(54) VIDEO GAME PROGRAM AND SYSTEM

(71) Applicant: KABUSHIKI KAISHA SQUARE ENIX, Tokyo (JP)

(72) Inventor: Tatsuya Hotaka, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 0 days.

(21) Appl. No.: 15/675,080

(22) Filed: Aug. 11, 2017

(65) Prior Publication Data
US 2018/0056182 A1 Mar. 1, 2018

(30) Foreign Application Priority Data

Aug. 31, 2016 (JP) ................ 2016-169766

(51) Int. Cl.
*A63F 13/00* (2014.01)
*A63F 13/358* (2014.01)
*H04N 21/24* (2011.01)

(52) U.S. Cl.
CPC .......... *A63F 13/358* (2014.09); *H04N 21/24* (2013.01); *A63F 2300/535* (2013.01)

(58) Field of Classification Search
CPC .......... A63F 13/00; A63F 13/12; G07F 13/00
See application file for complete search history.

(56) References Cited

U.S. PATENT DOCUMENTS 7,840,903 B1 11/2010 Amidon et al.
8,013,861 B2 * 9/2011 Hamilton, II .......... A63F 13/12
345/419

(Continued)

FOREIGN PATENT DOCUMENTS

JP 2000-306120 11/2000
JP 2001-232068 8/2001
(Continued)

OTHER PUBLICATIONS

Office Action from Japan Patent Office (JPO) in Japanese Patent Appl. No. 2016-169766, dated Sep. 5, 2017, together with a partial English language translation.
(Continued)

*Primary Examiner* — James S. McClellan
(74) *Attorney, Agent, or Firm* — Greenblum & Bernstein, P.L.C.

(57) ABSTRACT

A non-transitory computer-readable medium including a program product for causing a server to realize functions to control progress of a video game is provided. The functions include: an obtaining function configured to obtain communication quality information regarding a communication quality of one of user terminals; a determining function configured to determine a display condition of a character on the basis of the communication quality information; and a displaying function configured to cause the one user terminal to display a game image based on the determined display condition. In this case, the determining function includes a function configured to determine a condition regarding the number of characters included in the game image as the display condition, and the displaying function includes a function configured to cause the one user terminal to display the game image that satisfies the condition regarding the number of characters.

12 Claims, 9 Drawing Sheets

(56) References Cited

U.S. PATENT DOCUMENTS

| | | |
|---|---|---|
| 2004/0139158 A1 | 7/2004 | Datta |
| 2004/0180718 A1 | 9/2004 | Uchida et al. |
| 2009/0113338 A1* | 4/2009 | Hamilton, II ........... G06T 19/00 715/781 |
| 2010/0050004 A1 | 2/2010 | Hamilton, II et al. |

FOREIGN PATENT DOCUMENTS

| | | |
|---|---|---|
| JP | 2002-183762 | 6/2002 |
| JP | 2004-275412 | 10/2004 |

OTHER PUBLICATIONS

Office Action from Japan Patent Office (JPO) in Japanese Patent Appl. No. 2016-169766, dated Mar. 6, 2018, together with an English language translation.
Extended European Search Report from European Patent Office (EPO) in European Patent Appl. No. 17186021.6, dated Nov. 27, 2017.
Office Action issued in Japan Counterpart Patent Appl. No. P2016-169766, dated Sep. 11, 2018, along with an english translation thereof.

* cited by examiner

DISPLAY CONDITION INFORMATION

| COMMUNICATION QUALITY | DISPLAY CONDITION |
|---|---|
| HIGH QUALITY | 50 |
| NORMAL | 20 |
| LOW QUALITY | 5 | even# VIDEO GAME PROGRAM AND SYSTEM

CROSS-REFERENCE TO RELATED APPLICATION

The present application relates to subject matter contained in Japanese Patent Application No. 2016-169766 field on Aug. 31, 2016, the disclosure of which is expressly incorporated herein by reference in its entirety.

BACKGROUND OF THE INVENTION

1. Field of the Invention

At least one of embodiments according to the present invention relates to a non-transitory computer-readable medium including a program for causing a server to realize functions to control progress of a video game, a system therefor, and a non-transitory computer-readable medium including a program for causing a user terminal to realize functions to control progress of a video game.

2. Description of the Related Art

Heretofore, there is a video game system in which a plurality of players is caused to play the same video game using his or her game apparatus that is connected to the other game apparatuses via a network.

In such video game systems, for example, there is one in which the amount of data to be transmitted and received on a network is reduced by causing data of the content, which other player considers to hardly have a concern on progress of the video game with a state that a character of other player is placed in the video game, of data that are normally transmitted from a game apparatus at one player side to a game apparatus at other player side not to be transmitted (see Japanese Patent Application Publication No. 2001-232068).

However, in such a video game system, data that a designer of the system considers to have no concern are not to be transmitted. For this reason, there has been a problem that the data to be transmitted and received on the network may be omitted more than necessary. Namely, it is required a new video game system by which the amount of data to be transmitted and received on the network is adjusted.

SUMMARY OF THE INVENTION

It is an object of at least one of embodiments according to the present invention to solve the problem described above, and to provide a video game in which the amount of data to be transmitted and received on a network can be adjusted, whereby a comfortable operation can be maintained easily.

According to one non-limiting aspect of one embodiment of the present invention, there is provided a non-transitory computer-readable medium including a program product for causing a server to realize functions to control progress of a video game.

The functions include an obtaining function configured to obtain communication quality information regarding a communication quality of one of user terminals.

The functions also include a determining function configured to determine a display condition of a character on the basis of the communication quality information.

The functions also include a displaying function configured to cause the one user terminal to display a game image based on the determined display condition.

According to another non-limiting aspect of one embodiment of the present invention, there is provided a system for controlling progress of a video game. The system includes a communication network, a server, and a plurality of user terminals.

The system includes an obtaining section configured to obtain communication quality information regarding a communication quality of one of user terminals.

The system also includes a determining section configured to determine a display condition of a character on the basis of the communication quality information.

The system also includes a displaying section configured to cause the one user terminal to display a game image based on the determined display condition.

According to still another non-limiting aspect of one embodiment of the present invention, there is provided a non-transitory computer-readable medium including a program product for causing a user terminal to realize functions to control progress of a video game.

The functions include an obtaining function configured to obtain communication quality information regarding a communication quality of the user terminal.

The functions also include a determining function configured to determine a display condition of a character on the basis of the communication quality information.

The functions also include a displaying function configured to cause the user terminal to display a game image based on the determined display condition.

According to each of the embodiments of the present application, one or two or more shortages are solved.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Hereinafter, examples of embodiments according to the present invention will be described with reference to the drawings. In this regard, various kinds of elements in an example of each embodiment, which will be described below, can appropriately be combined with each other in a range where contradiction or the like did not occur. Further, explanation of the content that will be described as an example of an embodiment may be omitted in another embodiment. Further, the content of operations and/or processing with no relationship to characteristic portions of each embodiment may be omitted. Moreover, various kinds of processing that constitute various kinds of processing flows (will be described below) may be carried out in random order in a range where contradiction or the like did not occur in the content of the processing.

First Embodiment

Figure 1:
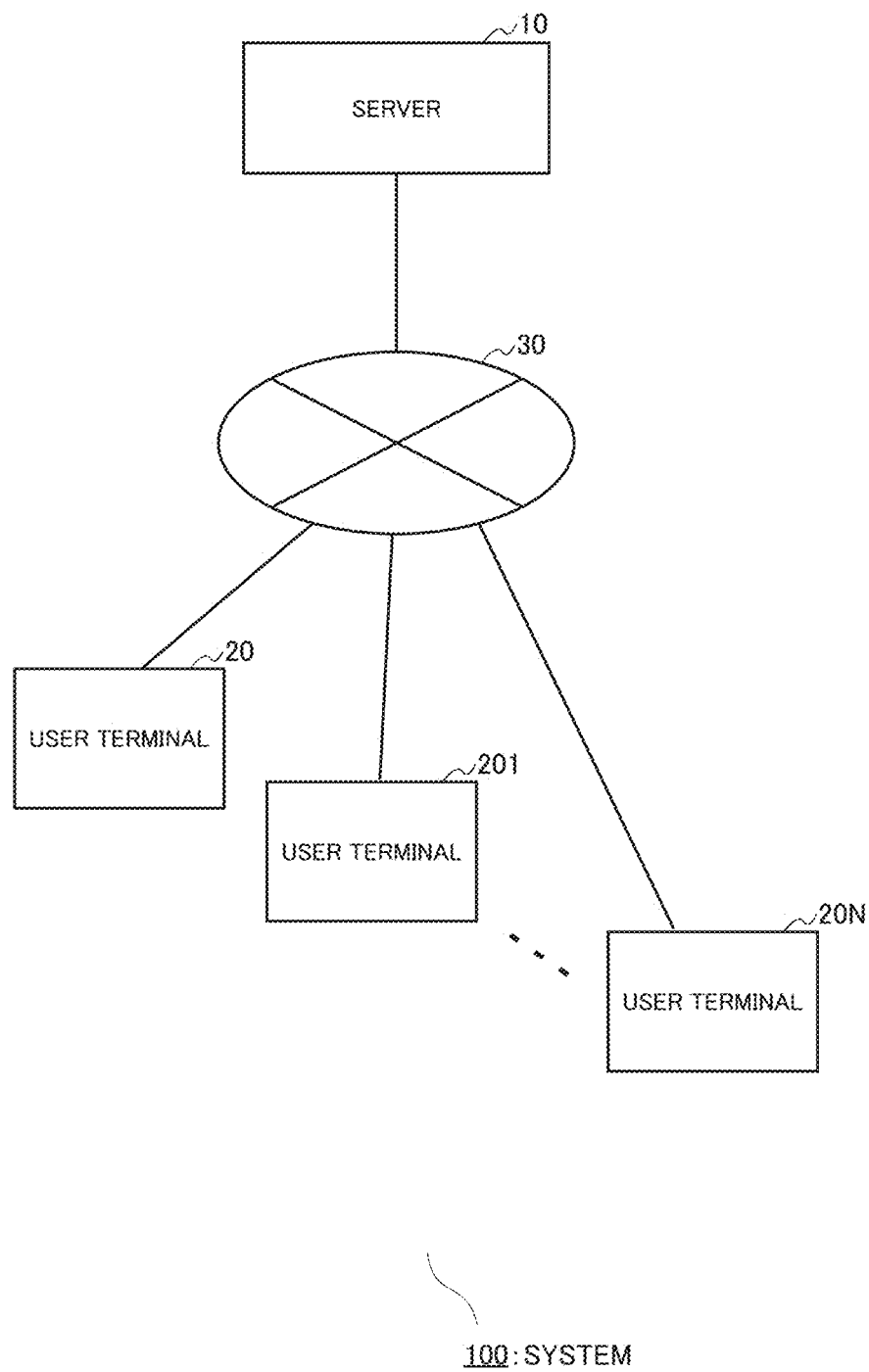
FIG. 1 is a block diagram showing an example of a configuration of a system corresponding to at least one of embodiments according to the present invention.

FIG. 1 is a block diagram showing an example of a configuration of a system 100 according to one embodiment of the present invention. As shown in FIG. 1, the system 100 includes a server 10 and a plurality of user terminals 20 and 201 to 20N ("N" is an arbitrary integer), each of which is used by a user of the system. In this regard, a configuration of the system 100 is not limited to this configuration. The system 100 may be configured so that a plurality of users uses a single user terminal, or may be configured so as to include a plurality of servers.

Each of the server 10A and the plurality of user terminals 20 and 201 to 20N is connected to a communication network 30 such as the Internet. In this regard, although it is not shown in the drawings, the plurality of user terminals 20 and 201 to 20N is connected to the communication network 30 by carrying out data communication with base stations managed by a telecommunication carrier by means of a radio communication line.

The system 100 includes the server 10A and the plurality of user terminals 20, 201 to 20N, thereby carrying out various kinds of processes to control progress of a video game.

Here, the phrase "progress of the video game" means occurrence of various kinds of progress or changes and the like that can be generated in the video game. As one example of the phrase "occurrence of various kinds of progress or changes and the like that can be generated in the video game", there are progress of time, a change in a parameter of a game element, update of a specific status or a flag, or an operational input by the user, and the like.

The server 10 is managed by an administrator of the system 100, and has various kinds of functions to provide information regarding the various kinds of processes to the plurality of user terminals 20, 201 to 20N. In the present embodiment, the server 10 is constructed by an information processing apparatus, such as a WWW server, and includes a storage medium for storing various kinds of information. In this regard, the server 10 is provided with a general configuration for carrying out the various kinds of processes, such as a control section and a communicating section, as a computer. However, its explanation herein is omitted. Further, in the system 100, it is preferable that the server 10 manages various kinds of information from a point of view to reduce a processing load on each of the plurality of user terminals 20, 201 to 20N. However, a storage region may be provided in a state that the server 10C can access the storage region. For example, the server 10 may be configured so as to be provided with a dedicated storage region outside the server 10.

Figure 2:
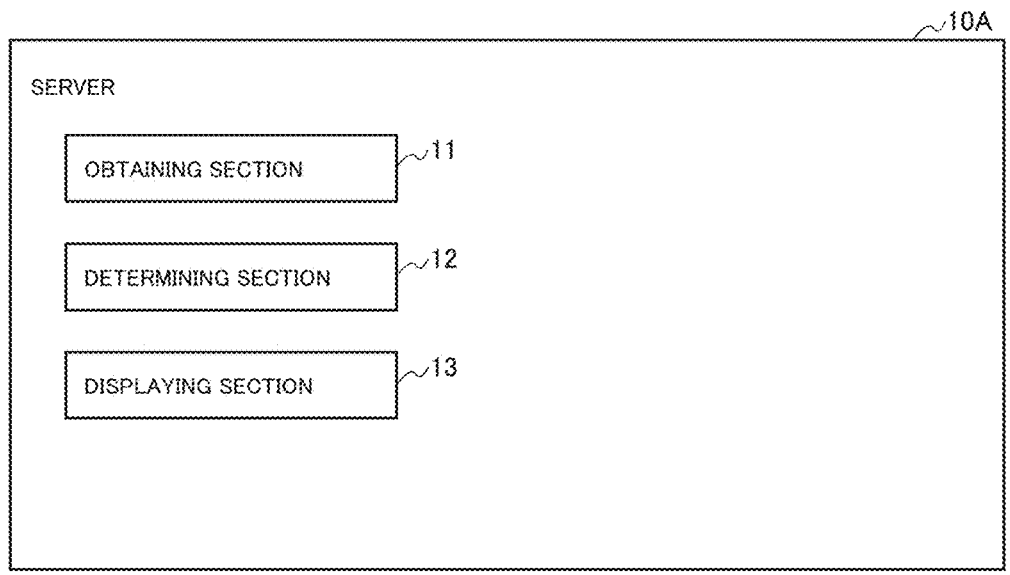
FIG. 2 is a block diagram showing a configuration of a server corresponding to at least one of the embodiments according to the present invention.

FIG. 2 is a block diagram showing a configuration of a server 10A, which is an example of the configuration of the server 10. As shown in FIG. 2, the server 10A at least includes an obtaining section 11 (which corresponds to one example of an obtaining function), a determining section 12 (which corresponds to one example of a determining function), and a displaying section 13 (which corresponds to one example of a displaying function).

The obtaining section 11 has a function to carry out a process to obtain communication quality information regarding a communication quality of one user terminal. Here, the communication quality information means information regarding a quality of communication. As examples of the communication quality information, there are an objective evaluation value (for example, RSSI, SNR, delay, jitter, and a wastage factor), a subjective evaluation value (for example, a value of evaluation regarding the communication quality evaluated by the user who plays the video game actually), and a combination of these values. It is preferable that the obtaining section 11 obtains the communication quality information from a user terminal at predetermined timing. As an example of the configuration in which the obtaining section 11 obtains communication quality information, there is a configuration in which the obtaining section 11 receives action instruction information for a player character and receives the communication quality information from a user terminal.

The determining section 12 has a function to carry out a process to determine how a character is displayed on the basis of the communication quality information. It is preferable that the determining section 12 determines a display condition of the character on the basis of the communication quality information. Here, the character means one kind of object in the video game. It is preferable that the character according to the present embodiment is a player character, which the user can operate, of characters each of which appears in the video game. In this regard, various kinds of objects that can become an operational target of the user, such as a so-called avatar, are included in a concept of the player character. Further the display condition of the character is not limited particularly so long as it is one regarding display of the character. As examples of the display condition, there are a condition regarding the number of characters included in a game image, a condition regarding a display mode of an action of a character, and the like. As an example of a configuration to determine the display condition, there is a configuration in which the determining section 12 refers to predetermined information in which a correspondence relation between a communication quality classified on the basis of the communication quality information and a display condition is defined; and determines a display condition according to the obtained communication quality information.

The displaying section 13 has a function to carry out a process to cause a user terminal to carry out a process to display a game image. Here, the phrase "cause a user terminal to display an image" means that the user terminal is caused to display the image on a display screen of a display device included in the user terminal. Further, the phrase "cause the display device to display on the display screen" means that the display device included in each of the user terminals 20, 201 to 20N is caused to output an image by means of communication using the communication network 30. As an example of a configuration to cause the display device to display an image, there is a configuration in which information generated at the server 10 side (that is, image information) is transmitted to each of the user terminals 20, 201 to 20N side. In this regard, the configuration of the image information is not limited particularly. For example, the image information may be information in which an image is compressed, or information for causing each of the user terminals 20, 201 to 20N to generate an image. As an example of the information in which an image is compressed, there is one used in a cloud gaming (for example, an MPEG). Further, as an example of the information for causing each of the user terminals 20, 201 to 20N to generate an image, there is one used in an online game (for example, positional information).

Each of the plurality of user terminals 20, 201 to 20N is managed by a user (or a player) who plays the video game, and is configured by a communication terminal, such as a cellular phone terminal, a PDA (Personal Digital Assistants), a mobile game device, and a so-called wearable divide, by which the user can play a network delivery type game, for example. In this regard, the configuration of the user terminal that the system 100 can include is not limited to the examples described above. It may be a configuration in which the user can recognize the video game. As other examples of the user terminal, there is a combination of a so-called wearable device, such as a smart watch, and a communication terminal or the like configured to communicate with the wearable device.

Further, each of the plurality of user terminals 20, 201 to 20N is connected to the communication network 30, and includes hardware (for example, a display device for displaying a game screen, an audio output device and the like) and software for carrying out the video game by communicating with the server 10. In this regard, each of the plurality of user terminals 20, 201 to 20N may be configured so as to be capable of directly communicating with each other without the server 10. Further, each of the plurality of user terminals 20, 201 to 20N outputs an image of the video game to the display device included therein on the basis of information transmitted from the server 10 (for example, information regarding a game image).

Next, an operation of the system 100 according to the present embodiment will be described.

Figure 3:
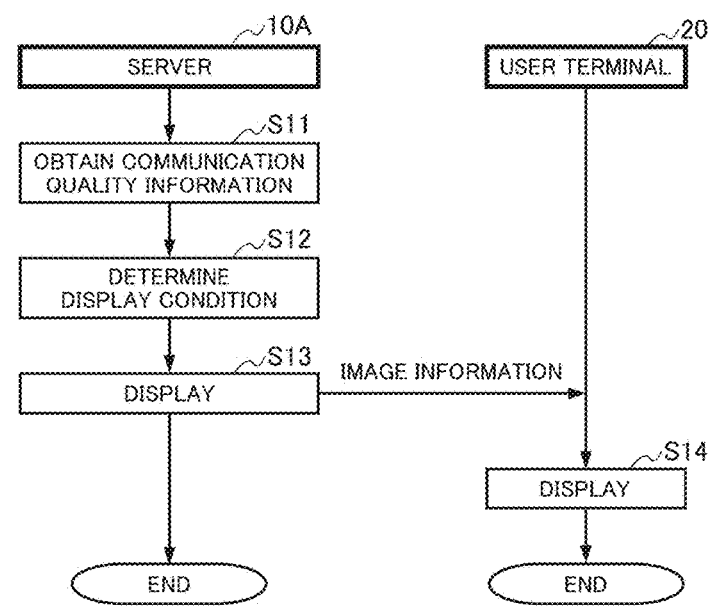
FIG. 3 is a flowchart showing an example of game related processing corresponding to at least one of the embodiments according to the present invention.

FIG. 3 is a flowchart showing an example of game related processing carried out by the system 100. Hereinafter, the case where the server 10A and the user terminal 20 (which corresponds to an example of one user terminal, and hereinafter, referred to as "the terminal 20") transmit and receive data regarding the video game will be described as an example.

In the game related processing, the server 10A first obtains communication quality information of the terminal 20 (Step S11). For example, the server 10A receives, from the terminal 20, communication quality information that is specified in advance via the terminal 20.

When the server 10A receives the communication quality information from the terminal 20, the server 10A determines a display condition of a character on the basis of the received communication quality information (Step S12). For example, the server 10A refers to information stored in a predetermined storage region to determine the display condition corresponding to the received communication quality information.

When the display condition is determined, the server 10A causes the terminal 20 to display a game image based on the determined display condition (Step S13). For example, the server 10A generates image information for causing the terminal 20 to display a game image based on a display condition, and transmits the generated image information to the terminal 20.

Subsequently, the terminal 20 displays the game image (Step S14), and terminates the processing herein. For example, the terminal 20 causes the display device to display, on the display screen, the game image based on the display condition in accordance with the image information received from the server 10A.

Figure 4:
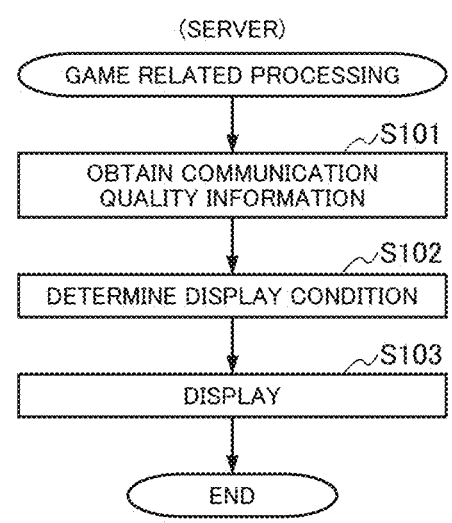
FIG. 4 is a flowchart showing an example of an operation of a server side in the game related processing corresponding to at least one of the embodiments according to the present invention.

FIG. 4 is a flowchart showing an example of an operation of the server 10A side in the game related processing. Here, an operation of the server 10A in the system 100 will be described again.

In the game related processing, the server 10A first obtains communication quality information of the terminal 20 (Step S101); determines a display condition of a character on the basis of the received communication quality information (Step S102); causes the terminal 20 to display a game image based on the determined display condition (Step S103); and terminates the processing herein.

Figure 5:
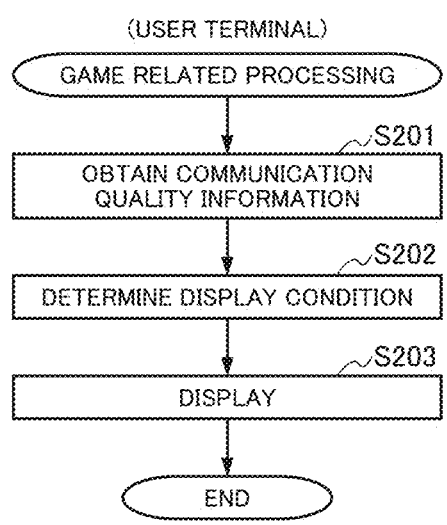
FIG. 5 is a flowchart showing an example of an operation of a terminal side in the game related processing corresponding to at least one of the embodiments according to the present invention.

FIG. 5 is a flowchart showing an example of an operation of the terminal 20 side in a case where the terminal 20 carries out the game related processing. Hereinafter, the case where the terminal 20 carries out the game related processing by a single body will be described as an example. In this regard, the terminal 20 is configured to include similar functions to those of the server 10. For this reason, its description will be omitted from a point of view to avoid repeated explanation.

In the game related processing, the terminal 20 first obtains communication quality information of the terminal 20 (itself) (Step S201); determines a display condition of a character on the basis of the received communication quality information (Step S202); causes the display device to display a game image based on the determined display condition on the display screen (Step S203); and terminates the processing herein. For example, the terminal 20 transmits, to the server 10A, instruction information for generating image information to display the game image based on the determined display condition. The server 10A then receives the instruction information from the terminal 20; generates image information based on the instruction information; and transmits the generated image information to the terminal 20.

As explained above, the server 10A for controlling progress of the video game is configured so as to include the obtaining section 11, the determining section 12, and the displaying section 13. Thus, the obtaining section 11 obtains the communication quality information regarding the communication quality of one user terminal; the determining section 12 determines the display condition of the character on the basis of the communication quality information; and the displaying section 13 causes the one user terminal to display the game image based on the determined display condition. Therefore, it is possible to provide a video game in which the amount of data to be transmitted and received on a network (that is, the communication network 30) can be adjusted, whereby a comfortable operation can be maintained easily.

Namely, as one side of the first embodiment, in a case where data are transmitted and received between the server 10 and the user terminal 20, the amount of data to be transmitted and received can be adjusted by adjusting display of a character that becomes a display target. Therefore, it is possible to provide a video game in which a comfortable operation can be maintained easily, and this makes it possible to improve an efficiency of execution of the video game.

Second Embodiment

Figure 6:
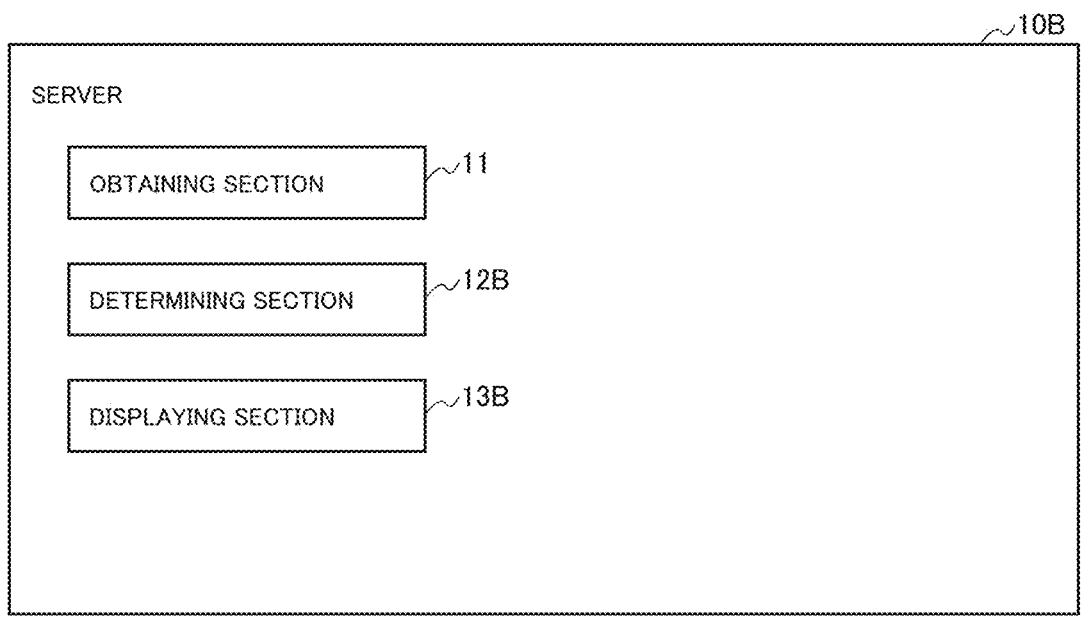
FIG. 6 is a block diagram showing a configuration of a server corresponding to at least one of the embodiments according to the present invention.

FIG. 6 is a block diagram showing a configuration of a server 10B, which is an example of the server 10. In the present embodiment, the server 10B at least includes an obtaining section 11, a determining section 12B, and a displaying section 13B.

The determining section 12B has a function to carry out a process to determine a condition regarding the number of characters to be displayed as a display condition. Here, the number of characters means the actual number of characters or a numerical value range. It is preferable that the determining section 12B refers to information in which a communication quality classified on the basis of communication quality information is associated with the number of characters (here, this information may be stored in a predetermined storage region) to determine a condition regarding the number of characters included in the game image. As examples of the condition regarding the number of characters, there are a numeral (for example, "20"), and a numerical value range (for example, "20 or less").

The displaying section 13B has a function to carry out a process to cause a user terminal 20 to display the game image so as not to exceed the number of characters determined by the determining section 12B (that is, the number of displayed character). It is preferable that the displaying section 13B causes the user terminal 20 to display a game image that satisfies a condition regarding the number of characters. As the configuration of the displaying section 13B, there is a configuration in which the determining section 12B causes the user terminal 20 to display a game image wherein the number of characters to be drawn does not exceed "20" in a case where a numeral "20" is determined in the determining section 12B.

Figure 7:
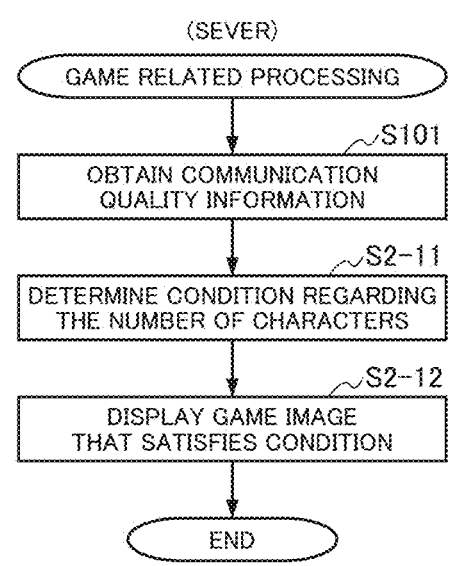
FIG. 7 is a flowchart showing an example of the game related processing corresponding to at least one of the embodiments according to the present invention.

FIG. 7 is a flowchart showing an example of the game related processing carried out by the system 100. Hereinafter, operations of the server 10B and the user terminal 20 (hereinafter, referred to as "the terminal 20") will be described as an example. In this regard, description of components or portions that have already been explained will be omitted from a point of view to avoid repeated explanation.

When the server 10B obtains communication quality information of the terminal 20 (Step S101), the server 10B determines a condition regarding the number of characters on the basis of the received communication quality information (Step S2-11).

When the condition regarding the number of characters is determined, the server 10B causes the terminal 20 to display a game image that satisfies the condition (Step S2-12), and terminates the processing herein.

As explained above, as one side of the second embodiment, the server 10B is configured so as to at least include the obtaining section 11, the determining section 12B, and the displaying section 13B. Thus, the determining section 12B determines the condition regarding the number of characters included in the game image as the display condition; and the displaying section 13B causes the terminal 20 to display the game image in which the number of characters satisfies the determined condition regarding the number of characters. Therefore, it is possible to provide a video game in which the amount of data to be transmitted and received on a network (that is, the communication network 30) can be adjusted, whereby a comfortable operation can be maintained easily.

Namely, as one side of the second embodiment, the number of characters to be displayed in the game image is adjusted on the basis of a communication quality of a destination. For this reason, it is possible to provide a video game in which a comfortable operation can be maintained easily even in a case where a range in which a large number of characters exists is displayed.

Third Embodiment

Figure 8:
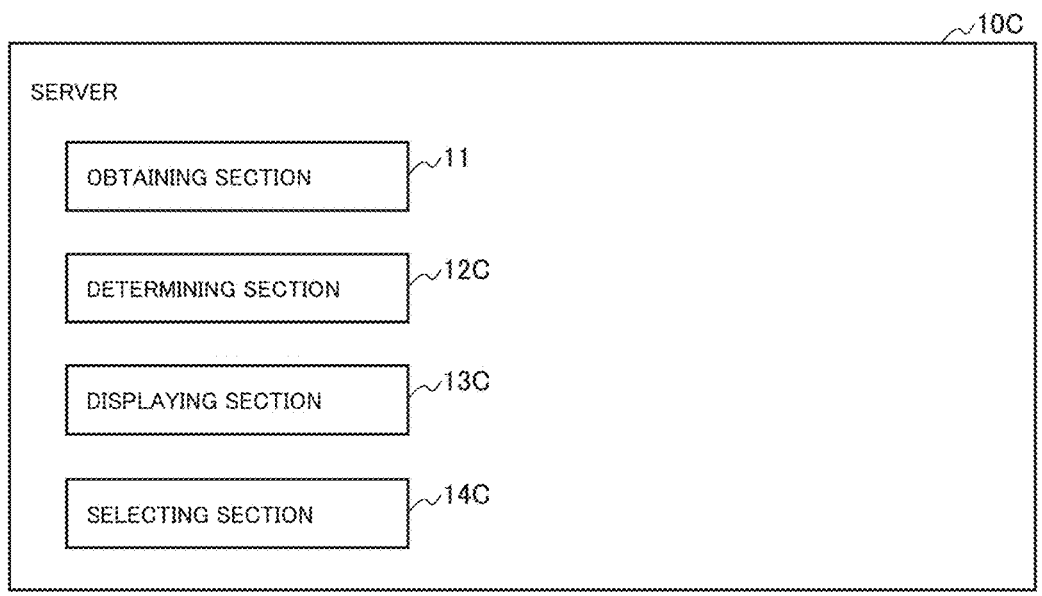
FIG. 8 is a block diagram showing a configuration of a server corresponding to at least one of the embodiments according to the present invention.

FIG. 8 is a block diagram showing a configuration of a server 100, which is an example of the server 10. In the present embodiment, the server 100 at least includes an obtaining section 11, a determining section 12C, a displaying section 13C, and a selecting section 14C (which corresponds to one example of a selecting function).

The determining section 12C has a function to carry out a process to determine a condition regarding a relationship with a user who operates one user terminal as a display condition. Here, the phrase "relationship with a user" means relationship that can be defined between the user and an object or a property regarding a relationship. The content of the "relationship with a user" is not limited particularly. However, it is preferable that the content means a special relationship that is generated between an object and the user in a video game. As examples of the condition regarding the relationship with the user, there are a condition "this is one's friend", a condition "this is one's rival", a condition "this belongs to the same group", a condition "this has an experience to fight together", a condition "a difference between play level values falls within a predetermined threshold value", and the like. Further, the relationship mentioned herein contains a unidirectional relationship and a bidirectional relationship. Namely, for example, in a case where the object is a user, the case where only one user of a plurality of users unidirectionally sets the other user as a friend is included in addition to the case where a plurality of users is set as a friend each other. It is preferable that the determining section 12C refers to information in which a communication quality classified on the basis of communication quality information is associated with a condition regarding the relationship with the user (this information may be stored in a predetermined storage region); and determines a display condition. As an example of the configuration of the determining section 12C, there is a configuration that the determining section 12C determines a display condition "this is one's friend" in accordance with the communication quality information.

The displaying section 13C has a function to carry out a process to cause a user terminal 20 (hereinafter, referred to as a "terminal 20") to display a user (or a character operated by the user) that satisfies a predetermined relationship with the user. It is preferable that the displaying section 13C causes the terminal 20 to display a game image in which a character that satisfies a condition regarding a relationship with the user of the terminal 20 (that is, a user who operates a user terminal as a destination or a player character of the user) is drawn. As an example of the configuration of the displaying section 13C, there is a configuration in which the displaying section 13C causes the terminal 20 to display a game image, in which a character selected by the selecting section 14C is drawn.

The selecting section 14C has a function to carry out a process to select a character that satisfies the determined condition. It is preferable that the selecting section 14C selects a user (or a character operated by the user) that satisfies a predetermined relationship with the user. As an example of the configuration of the selecting section 14C, there is a configuration in which the selecting section 14C refers to information regarding the user (this information may be stored in a predetermined storage region); and determines whether a character that becomes a selection target satisfies a predetermined relationship with the user of a destination of data or not.

Figure 9:
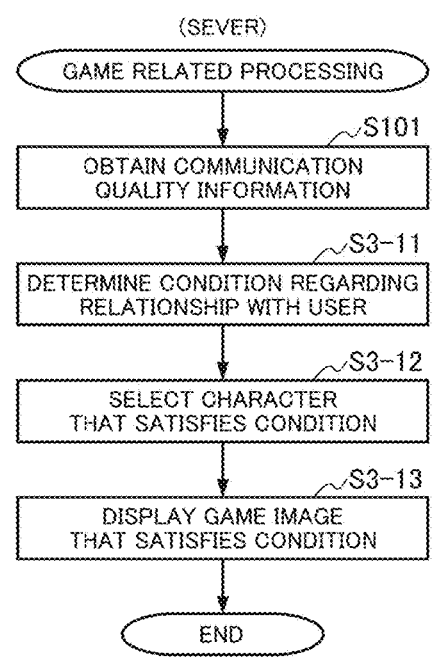
FIG. 9 is a flowchart showing an example of the game related processing corresponding to at least one of the embodiments according to the present invention.

FIG. 9 is a flowchart showing an example of the game related processing carried out by the system 100. Hereinafter, operations of the server 10C and the terminal 20 will be described as an example. In this regard, description of components or portions that have already been explained will be omitted from a point of view to avoid repeated explanation.

When the server 10C obtains communication quality information of the terminal 20 (Step S101), the server 10C determines a condition regarding a relationship with a user on the basis of the received communication quality information (Step S3-11).

When the condition regarding the relationship with the user is determined, the server 10C selects a character that satisfies the condition (Step S3-12).

When the character is selected, the server 100 causes the terminal 20 to display a game image in which the selected character is drawn (Step S3-13), and terminates the processing herein.

As explained above, as one side of the third embodiment, the server 100 is configured so as to at least include the obtaining section 11, the determining section 12C, the displaying section 13C, and the selecting section 14C. Thus, the determining section 12C determines the condition regarding the relationship with the user who operates the one user terminal as the display condition; the selecting section 14C selects the character that satisfies the determined condition regarding the relationship with the user; and the displaying section 13C causes the one user terminal to display the game image in which the selected character is drawn. Therefore, it becomes possible to provide a video game in which a comfortable operation can be maintained easily while maintaining the display of information useful for the user of user terminal as a destination.

Namely, as one side of the third embodiment, the character to be displayed in the game image is adjusted on the basis of the communication quality of the destination. For this reason, it becomes possible to provide a video game in which a comfortable operation can be maintained easily while maintaining the display of information useful for the user of the user terminal as a destination even in a case where a range in which a large number of characters exists is displayed.

Fourth Embodiment

Figure 10:
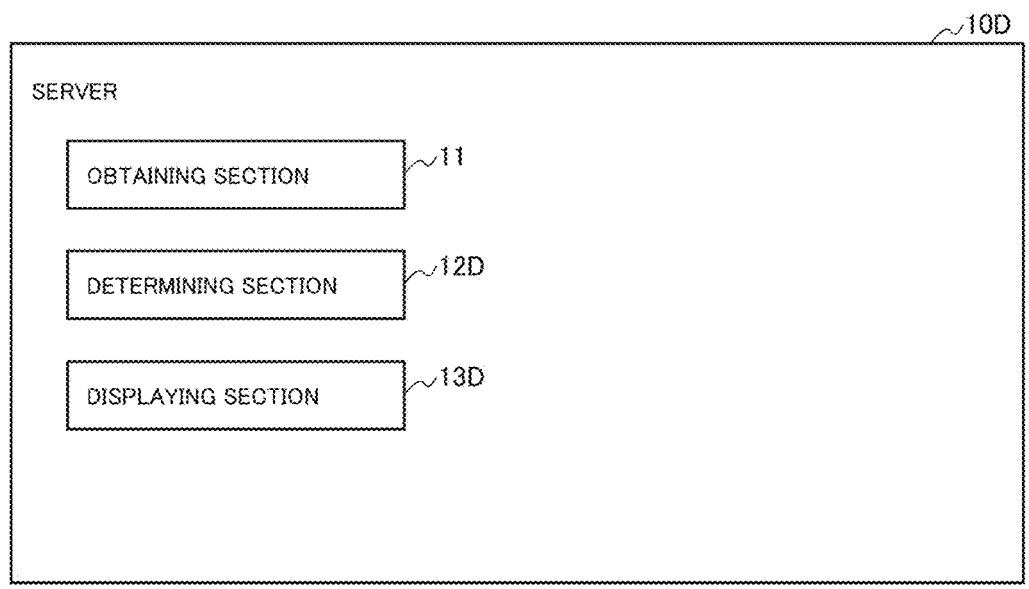
FIG. 10 is a block diagram showing a configuration of a server corresponding to at least one of the embodiments according to the present invention.

FIG. 10 is a block diagram showing a configuration of a server 10D, which is an example of the server 10. In the present embodiment, the server 10D at least includes an obtaining section 11, a determining section 12D, and a displaying section 13D.

The determining section 12D has a function to carry out a process to determine a condition regarding a display mode of an action of a character as a display condition. Here, the "action of the character" means an action or a motion of the character when the character carries out something in a video game. As examples of the action of the character, there are "walking", "making a dash", a "punch", a "kick", a "special weapon" and the like. Further, the display mode means a state of an object so that a user can recognize the object. As examples of the display mode, there are an "action itself", an "effect", and the like. The content of the "condition regarding a display mode" is not limited particularly. However, there is a condition that any display quality is indicated in a case where display qualities are set stepwisely with respect to display modes, for example. In this regard, it is preferable that an action of a character is drawn in a more detailed and dynamic mode in a case where a display quality is high. Further, it is preferable that an action of a character is drawn in a simplified mode in a case where a display quality is low. Here, the phrase "a display quality is high" means that the amount of data is large compared with a case where the display quality is low. It is preferable that the determining section 12D refers to information in which a communication quality classified on the basis of communication quality information is associated with the condition regarding the display mode of the action of the character (this information may be stored in a predetermined storage region); and determines a display condition. As an example of the configuration of the determining section 12D, there is a configuration in which the determining section 12D refers to information in which three stages of display qualities including a "high display quality", a "normal display quality", and a "low display quality" are respectively associated with communication qualities; and determines one display quality in accordance with the obtained communication quality information.

The displaying section 13D has a function to carry out a process to cause a user terminal 20 (hereinafter, referred to as a "terminal 20") to display a game image in which an action of the character is drawn in the display mode determined by the determining section 12D. It is preferable that the displaying section 13D causes the terminal 20 to display a game image based on a condition regarding the display mode of the action of the character. As an example of the configuration of the displaying section 13D, there is a configuration in which in a case where the determining section 12D determines the condition "high display quality", the displaying section 13D causes the terminal 20 to display a game image in which an action of a character displayed in the game image is drawn with "high display quality".

Figure 11:
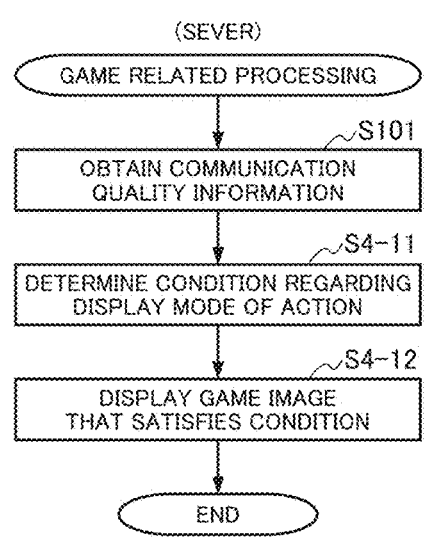
FIG. 11 is a flowchart showing an example of the game related processing corresponding to at least one of the embodiments according to the present invention.

FIG. 11 is a flowchart showing an example of the game related processing carried out by the system 100. Hereinafter, operations of the server 10D and the terminal 20 will be described as an example. In this regard, description of components or portions that have already been explained will be omitted from a point of view to avoid repeated explanation.

When the server 10D obtains communication quality information of the terminal 20 (Step S101), the server 10D determines a condition regarding a display mode of a character on the basis of the received communication quality information (Step S4-11).

When the condition regarding the display mode of the action of the character is determined, the server 10D causes the terminal 20 to display a game image that satisfies the condition regarding the display mode of the action of the character (Step S4-12), and terminates the processing herein.

As explained above, as one side of the fourth embodiment, the server 10D is configured so as to at least include the obtaining section 11, the determining section 12D, and the displaying section 13D. Thus, the determining section 12D determines the condition regarding the display mode of the action of the character as the display condition; and causes the user terminal 20 to display the game image based on the determined condition regarding the display mode of the action of the character. Therefore, it becomes possible to provide a video game in which a comfortable operation can be maintained easily.

Namely, as one side of the fourth embodiment, the display mode of the action of the character to be displayed in the game image is adjusted on the basis of the communication quality of the destination. For this reason, it becomes possible to provide a video game in which a comfortable operation can be maintained easily even in a case where a range in which a large number of characters exists is displayed.

Fifth Embodiment

Figures 12, 13:
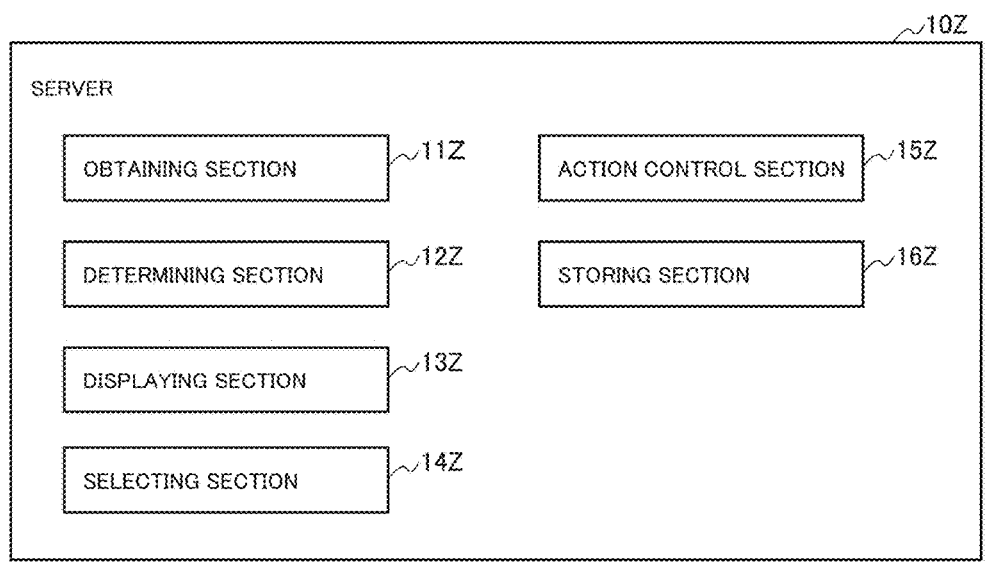
FIG. 12 is a block diagram showing a configuration of a server corresponding to at least one of the embodiments according to the present invention.
FIG. 13 is an explanatory drawing for explaining an example of a storage state of information corresponding to at least one of the embodiments according to the present invention.

FIG. 12 is a block diagram showing a server 10Z, which is an example of the server 10 in the system 100 (see FIG. 1). In the present embodiment, the server 10Z at least includes an obtaining section 11Z, a determining section 12Z, a displaying section 13Z, a selecting section 14Z, an action control section 15Z, and a storing section 16Z.

A video game according to the present embodiment is a video game in which a plurality of users can participate. Each of the plurality of users operates a corresponding user terminal of the plurality of users, and the player character of each of the plurality of users is caused to operate within the same one virtual space. Here, the virtual space means a space in which the character of the video game virtually exists. The configuration of the virtual space is not limited particularly so long as the virtual space is configured so that a game screen can be generated. As examples of the virtual space, there are a two-dimensional space and a three-dimensional space. Further, it is preferable that a plurality of characters that the users of the plurality of user terminals respectively operate is arranged and operated in the virtual space. The player character operated by the user of each of the user terminals and a non-player character that is not operated by any user act within the virtual space. In the non-player character, an enemy character, and a character other than the enemy character (for example, a character that introduces the setting of a story, a character that provides a service to the player character, and the like) are included.

The obtaining section 11Z has a function to carry out a process to receive communication quality information regarding a communication quality from a user terminal that becomes a destination of data. In the present embodiment, the obtaining section 11Z receives the communication quality information together with action instruction information for the player character from the user terminal of the user who participates in the video game, thereby obtaining the communication quality information each of the user terminals each of which becomes a destination of the data. Here, it is preferable that each of the user terminals is configured so that communication quality information thereof can be specified.

The determining section 12Z has a function to refer to display condition information stored in the storing section 16Z on the basis of the communication quality information obtained by the obtaining section 12Z to determine a display condition. In the present embodiment, the determining section 12Z determines the number of characters in accordance with the communication quality information as the display condition.

The displaying section 13Z has a function to carry out a process to cause a user terminal 20 to display a game image in which the plurality of characters acts or is operated in one virtual space, and to cause the user terminal 20 to display a game image in which a character selected on the basis of the display condition is drawn. In the present embodiment, the displaying section 13Z generates image information for causing the user terminal 20 (hereinafter, referred to as "the terminal 20") to display the game image in which the selected character is drawn, and transmits the generated image information to the terminal 20. In this regard, in the present embodiment, a character that is not included in the selection target and a character that cannot become a target of selection may be positioned in the game image displayed on the basis of the image information. For example, the character of the user himself or herself may always be included in the game image.

The selecting section 14Z has a function to carry out a process to select player characters to be drawn so as to fall in the number of player characters, which is determined by the determining section 12Z. In the present embodiment, the selecting section 14Z selects, on the basis of a predetermined priority condition, a first player character that is displayed (that is, the player character is drawn in the game image) and a second player character that is not displayed (that is, the player character that is not drawn in the game image) among the player characters that exist within a range that is displayed in the virtual space as the game image. The predetermined priority condition according to the present embodiment is a condition that a player character near a player character of a user who operates a user terminal as a data transmission object (which corresponds to an example of one user terminal) is prioritized. Namely, the predetermined priority condition according to the present embodiment is a condition that "a position of the player character operated by the user of the user terminal as the destination of data" becomes a reference. As a result, a player character that is apart from the position of the player character operated by the user may not be drawn. In this regard, in the present embodiment, "the number of player characters determined by the determining section 12Z" is a numeral that does not include a player character operated by a user of a user terminal on which the game image is displayed. However, the player character operated by the user of the user terminal on which the game image is displayed may be included in the number.

The action control section 15Z has a function to carry out a process regarding movement of the character in the virtual space and control for an action of the character. In the present embodiment, the action control section 15Z carries out a process regarding control of the action of the player character operated by the user of each of a plurality of user terminals on the basis of the action instruction information received from the terminal 20. As an example of the configuration of the action control section 15Z, there is a configuration that the action control section 15Z determines a coordinate position at which the character exists in the virtual space, and determines a motion of the character.

The storing section 16Z is a storage medium for storing various kinds of information used for progress of the video game. The display condition information is stored in the storing section 16Z according to the present embodiment.

FIG. 13 is an explanatory drawing for explaining an example of a storage state of the display condition information. Here, the display condition information means information regarding a display condition, and is information in which a correspondence relation between the communication quality and the display condition is defined. As shown in FIG. 13, the display condition information according to the present embodiment is configured so that the number of player characters as the display condition increases as the communication quality becomes higher (that is, the higher the communication quality becomes, the more the number of player characters as the display condition increases). More specifically, the number of player characters of "50" is associated with a communication quality with a "high quality". Further, the number of player characters of "20" is associated with a "normal" communication quality. Further, the number of player characters of "5" is associated with a communication quality with a "low quality". As an example of a configuration to determine to which communication quality the communication quality information belongs, there is a configuration in which a communication quality belongs to a "high quality" in a case where a value of the RSSI is "−67 dBm or higher", a communication quality belongs to a "normal" quality in a case where a value of the RSSI is "lower than −67 dBm and −75 dBm or higher", and a communication quality belongs to a "low quality" in a case where a value of the RSSI is "lower than −75 dBm".

Figure 14:
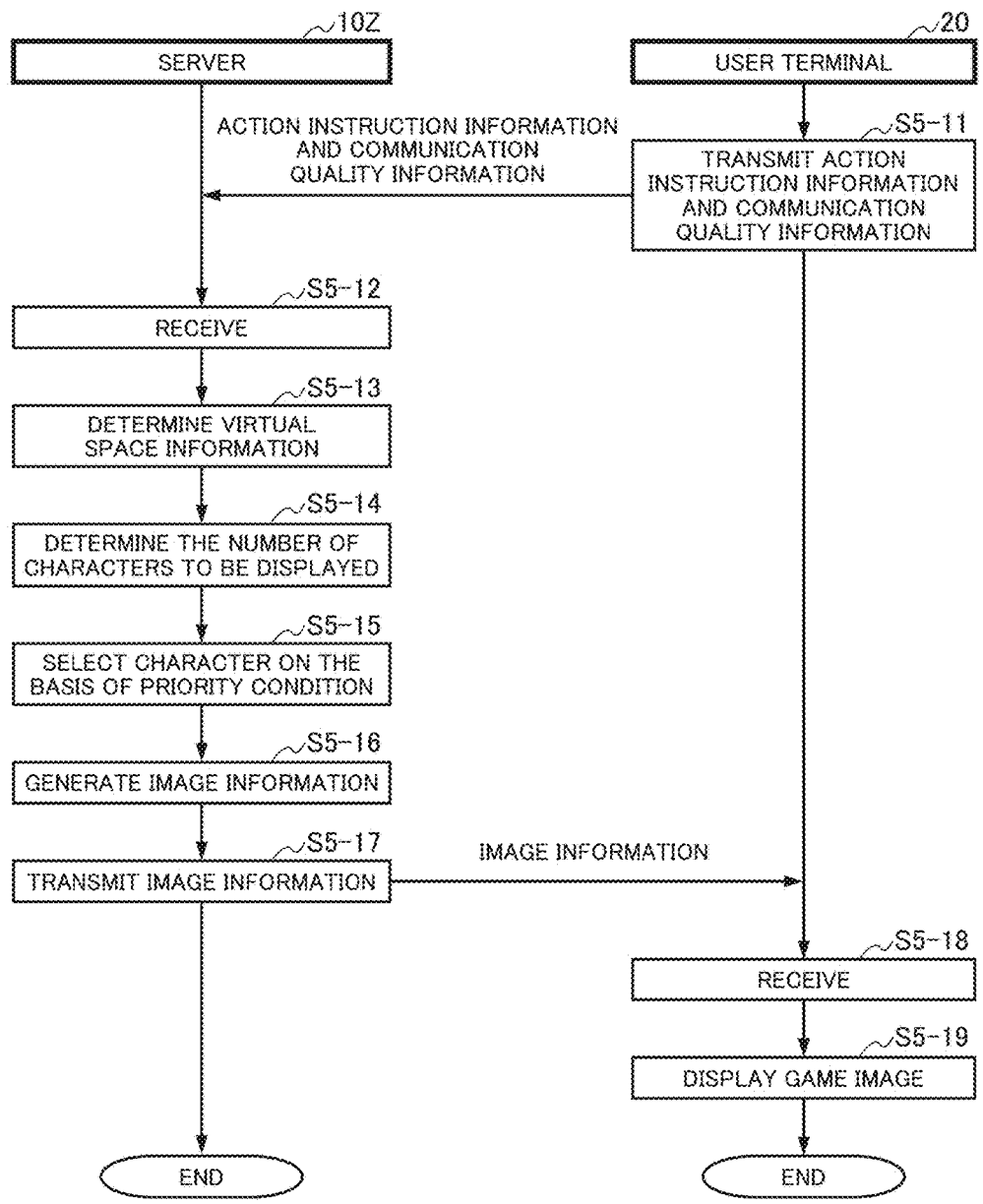
FIG. 14 is a flowchart showing an example of the game related processing corresponding to at least one of the embodiments according to the present invention.

FIG. 14 is a flowchart showing an example of the game related processing carried out by the system 100. Hereinafter, operations of the server 10Z and the terminal 20 will be described as an example. In this regard, description of components or portions that have already been explained will be omitted from a point of view to avoid repeated explanation.

In the game related processing, the terminal 20 first transmits action instruction information for a player character and communication quality information to the server 10Z (Step S5-11).

The server 10Z receives the action instruction information and the communication quality information of the player character (Step S5-12). In the present embodiment, the server 10Z receives communication quality information in which a value of RSSI is "−80 dBm".

When the server 10Z receives the information, the server 10Z determines information regarding an existence position and an action of the player character in a virtual space (hereinafter, referred to as "virtual space information") on the basis of the action instruction information (Step S5-13).

Subsequently, the server 10Z determines a display condition on the basis of the communication quality information and the display condition information (Step S5-14). For example, in the example of the display condition information shown in FIG. 13, the server 10Z determines "5" as a display condition (in the present embodiment, the number of characters to be displayed) because a value of the RSSI indicated by the received communication quality information is "lower than −75 dBm".

When the display condition is determined, the server 10Z selects a player character to be drawn so as to satisfy the determined display condition (Step S5-15). In the present embodiment, the server 10Z specifies information regarding a position of a player character PC1 that the user of the terminal 20 operates and information regarding a position of each of player characters that exist within a display range on the basis of the virtual space information, and selects "5" player characters in the order closer to the player character PC1 on the basis of the specified information regarding the position.

Figure 15:
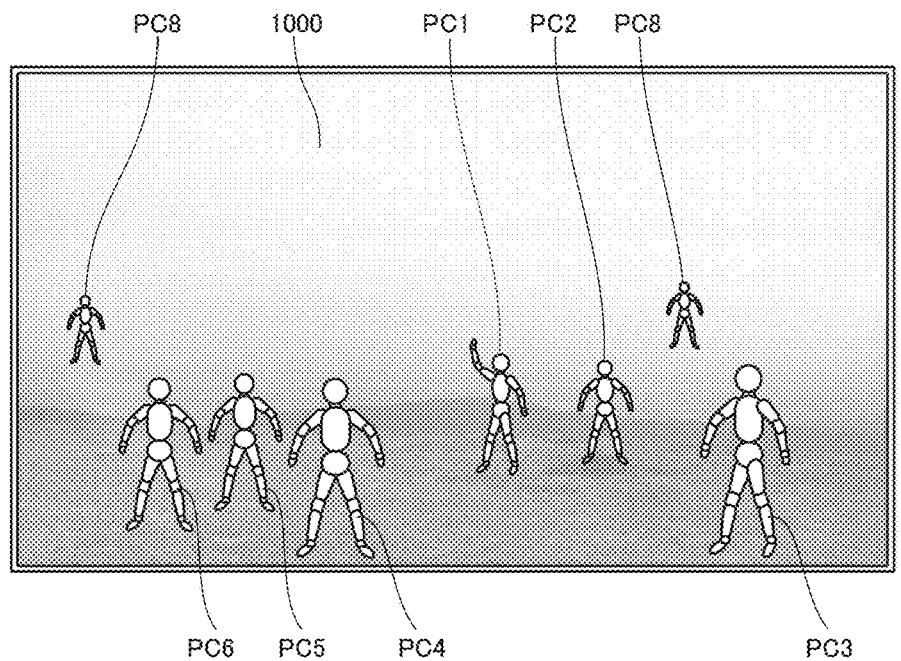
FIG. 15 is an explanatory drawing for explaining a concept corresponding to at least one of the embodiments according to the present invention.

FIG. 15 is an explanatory drawing for explaining a concept for selecting a player character. As shown in FIG. 15, in a virtual space 1000, a plurality of player characters PC2 to PC8 exists around the player character PC1 that the user of the terminal 20 operates. The "5" player characters near the player character PC1 among them are five player characters PC2 to PC6. Therefore, the five player characters PC2 to PC6 are selected as the player characters to be drawn.

When the player characters are selected, the server 10Z generate image information for causing the terminal 20 to display a game image in which the selected player characters are drawn (Step S5-16). In the present embodiment, the server 10Z generate image information in which the player character PC1 that the user of the terminal 20 operates is contained in addition to the selected player characters.

When the image information is generated, the server 10Z transmits the generated image information to the terminal 20 (Step S5-17).

When the terminal 20 receives the image information (Step S5-18), the terminal 20 causes a display device included therein to display, on a display screen thereof, a game image in which the selected player characters are drawn on the basis of the received image information (Step S5-19), and terminates the processing herein.

Figure 16:
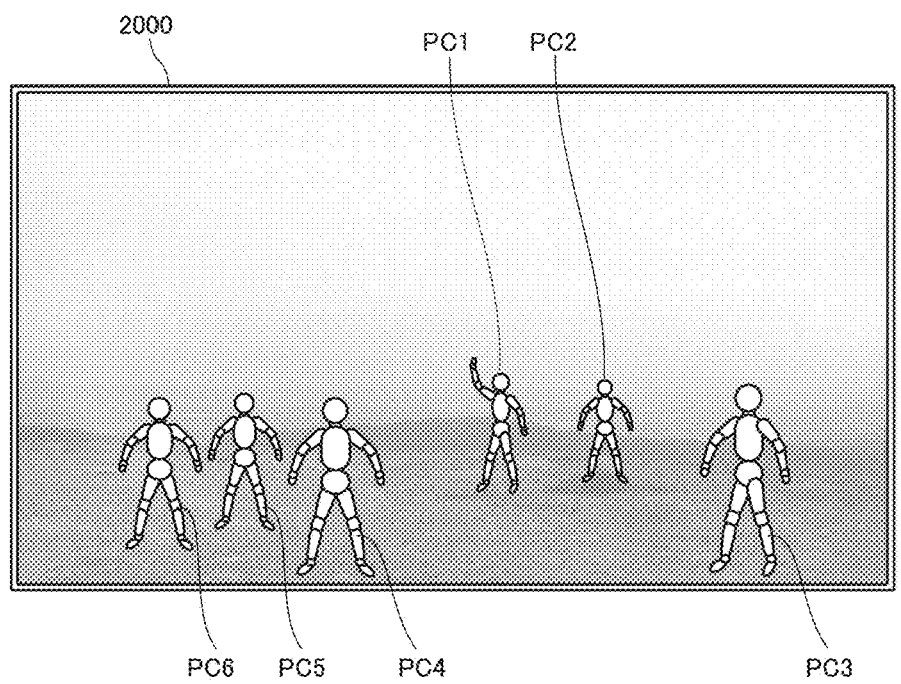
FIG. 16 is an explanatory drawing for explaining an example of a display screen corresponding to at least one of the embodiments according to the present invention.

FIG. 16 is an explanatory drawing for explaining an example of the display screen. As shown in FIG. 16, the five player characters PC2 to PC6 are displayed in a display screen 2000. In the virtual space shown in FIG. 15, the eight player characters PC1 to PC8 exist within a range that is displayed in the display screen 2000. However, the selected player characters are the six player characters PC1 to PC6 including the player character PC1. For this reason, the player characters to be drawn in the game image are only the six player characters PC1 to PC6. In this regard, it is configured so that the corresponding number of characters to be displayed increases by improving the communication quality. For this reason, the two player character PC7 and PC8 that have not been selected in the example described above may also be selected and displayed depending upon the communication quality.

As explained above, the server 10Z for controlling progress of the video game is configured so as to include the obtaining section 11Z, the determining section 12Z, the displaying section 13Z, the selecting section 14Z, the action control section 15Z, and the storing section 16Z. Thus, the obtaining section 11Z obtains the communication quality information regarding the communication quality of the one user terminal; the determining section 12Z determines the display condition of the character on the basis of the communication quality information; and the displaying section 13Z causes the one user terminal to display the game image based on the determined display condition. Therefore, it becomes possible to provide a video game in which the amount of data to be transmitted and received on a network (that is, the communication network 30) can be adjusted, whereby a comfortable operation can be maintained easily.

In this regard, it has not been mentioned particularly in the fifth embodiment described above. However, the system 100 may be configured so as to determine a display condition of each of characters that includes a player character and a non-player character. Namely, the system 100 may be configured so that a character that is not operated by the user, such as an enemy character, is included in a case where a character is selected so as to satisfy the number of characters. In this case, the system 100 may be configured so as to select a character on the basis of a condition that the enemy character is preferentially displayed as the predetermined priority condition.

Further, it has not been mentioned particularly in the fifth embodiment described above. However, the system 100 may be configured so as to refer to character information in which an influence degree that the user cannot visually recognize progress of the video game is set in advance; and to determine a condition that a character with a higher influence degree is preferentially displayed as the predetermined priority condition. In this case, the character information may be stored in a predetermined storage region. It is preferable that influence degrees are set in a stepwise manner. In this regard, the configuration to set the influence degree is not limited particularly. For example, the system 100 may be configured so as to set an influence degree of each of various kinds of characters in response to an operation of each of the users. By configuring the system 100 so as to use the influence degree, for example, it becomes possible to avoid a situation that an attack is received from an enemy character that the user cannot view by omitting display of the enemy character. However, the system 100 may be configured so that it is permitted to omit display of a character with a high influence degree on the user. This is because it can be thought that omission of display of a character may not become a problem depending upon a property of the video game.

Further, it has not been mentioned particularly in the fifth embodiment described above. However, the system 100 may be configured so as to determine a display condition of a display target in the virtual space in which an object that does not influence on an operation of the user, such as a building, is included in addition to the characters. Namely, the system 100 may be configured so as to determine a display condition of an object that appears in the video game. Further, in this case, the system 100 may be configured so as to refer to object information in which an influence degree that the user cannot visually recognize progress of the video game is set in advance; and to determine a condition that an object with a higher influence degree is preferentially displayed as the predetermined priority condition.

Further, it has not been mentioned particularly in the fifth embodiment described above. However, the system 100 may be configured so as to determine a condition that "a range to be displayed as the game image in one virtual space (that is, a photographing range of a virtual camera)" becomes a reference as the predetermined priority condition. For example, the system 100 may be configured so that a function to determine and select as a character determines a condition that a player character positioned near a center position of the range to be displayed in the game image in the one virtual space is preferentially displayed as the predetermined priority condition.

Further, it has not been mentioned particularly in the fifth embodiment described above. However, the system 100 may be configured so as to determine a condition that the "relationship with the user" becomes a reference as the predetermined priority condition. For example, the system 100 may be configured so as to determine a condition that a user who satisfies a predetermined relationship with the user (or a player character) is preferentially displayed as the predetermined priority condition. As examples of the predetermined relationship mentioned herein, there are a relationship "this is one's friend", a relationship "this is one's rival", a relationship "this belongs to the same group", a relationship "this has an experience to fight together", a relationship "a difference between play level values falls within a predetermined threshold value", and the like. Further, the relationship mentioned herein includes a unidirectional relationship and a bidirectional relationship. Namely, the case where only one user is unidirectionally set as a friend of the other user is included in addition to the case where users are set as a friend each other.

Further, it has not been mentioned particularly in the fifth embodiment described above. However, the system 100 may be configured so as to cause the user terminal 20 to display a game image in which a character that satisfies a predetermined relationship with the user is drawn in a case where a character that exists within the range to be displayed as the game image in the one virtual space and satisfies a predetermined relationship with the user who operates the one user terminal is included among characters that are drawn in the game image on the basis of the display condition regarding the number of characters included in the game image. As one example, the system 100 may be configured so that a character X is displayed (or drawn in the game image) regardless of a display condition in a case where the number of characters of "5" is determined as the display condition and the character X that has a predetermined relationship with a user and is not included in the "5" selected characters exists within the display range. In this case, as a result, the number of characters to be drawn in the game image exceeds the determined number as the display condition. Further, as other example, the system 100 may be configured so that in a case where the number of characters of "5" is determined as the display condition and a character X that has a predetermined relationship with a user and is not included in the "5" selected characters exists within the display range, anyone character of the "5" selected characters is exchanged by the character X to select a character to be drawn.

As explained above, one or two or more shortages can be solved by each of the embodiments according to the present application. In this regard, the effects by each of the embodiments are non-limiting effects or one example of the non-limiting effects.

In this regard, in each of the embodiments described above, each of the plurality of user terminals 20, 201 to 20N and the server 10 carries out the various kinds of processing described above in accordance with various kinds of control programs (for example, a video game processing program) stored in the storage device with which the corresponding terminal or server is provided.

Further, the configuration of the system 100 is not limited to the configuration that has been explained as an example of each of the embodiments described above. For example, the system 100 may be configured so that the server 10 carries out a part or all of the processes that have been explained as the processes carried out by the user terminal. Alternatively, the system 100 may be configured so that any of the plurality of user terminals 20, 201 to 20N (for example, the user terminal 20) carries out a part or all of the processes that have been explained as the processes carried out by the server 10. Further, the system 100 may be configured so that a part or all of the storing sections included in the server 10 is included in any of the plurality of user terminals 20, 201 to 20N. Namely, the system 100 may be configured so that a part or all of the functions of any one of the user terminal 20 and the server 10 according to the system 100 is included in the other.

Appendix

The explanation of the embodiments described above has been described so that the following inventions can be at least realized by a person having a normal skill in the art to which the present invention belongs.

(1) A non-transitory computer-readable medium including a program product for causing a server to realize functions to control progress of a video game,
wherein the functions include:
an obtaining function configured to obtain communication quality information regarding a communication quality of one of user terminals;
a determining function configured to determine a display condition of a character on the basis of the communication quality information; and
a displaying function configured to cause the one user terminal to display a game image based on the determined display condition.

(2) The non-transitory computer-readable medium according to claim (1),
wherein the determining function includes a function configured to determine a condition regarding the number of characters included in the game image as the display condition, and
wherein the displaying function includes a function configured to cause the one user terminal to display the game image that satisfies the condition regarding the number of characters.

(3) The non-transitory computer-readable medium according to claim (1) or (2),
wherein the determining function includes a function configured to determine a condition regarding a relationship with a user who operates the one user terminal as the display condition,
wherein the functions further include:
a selecting function configured to select a character that satisfies the determined condition regarding the relationship with the user, and
wherein the displaying function includes a function configured to cause the one user terminal to display the game image so that the character selected by the selecting function is drawn.

(4) The non-transitory computer-readable medium according to any one of claims (1) to (3),
wherein the determining function includes a function configured to determine a condition regarding a display mode of an action of the character as the display condition, and
wherein the displaying function includes a function configured to cause the one user terminal to display the game image based on the determined condition regarding the display mode of the action of the character.

(5) The non-transitory computer-readable medium according to claim (2),
wherein the functions further include:
a selecting function configured to select a first character that is displayed and a second character that is not displayed on the basis of a predetermined priority condition in a case where the number of characters, which exist within a range that is displayed in one virtual space as the game image, does not satisfy the determined condition regarding the number of characters.

(6) The non-transitory computer-readable medium according to claim (5),
wherein the selecting function includes a function configured to select a character as the first character on the basis of a condition that a character near a character, which is an operational target of a user who operates the one user terminal, is preferentially displayed, as the predetermined priority condition.

(7) The non-transitory computer-readable medium according to claim (5),
wherein the selecting function includes a function configured to select a character as the first character on the basis of a condition that a character near a center position of the range that is displayed in the one virtual space as the game image is preferentially displayed, as the predetermined priority condition.

(8) The non-transitory computer-readable medium according to claim (2),
wherein the displaying function includes a function configured to cause the one user terminal to display a game image in a case where a character that satisfies a predetermined relationship with a user who operates the one user terminal is included in characters that exist within the range that is displayed in one virtual space as the game image and the character is not drawn in the game image on the basis of the determined display condition, the character that satisfies the predetermined relationship with the user being drawn in the game image.

(9) A non-transitory computer-readable medium including a program product for causing a user terminal to realize at least one function of the functions that the program product described in any one of claims (1) to (8) causes the server to realize, the user terminal being capable of communicating with the server.

(10) A server into which the program product contained in the non-transitory computer-readable medium according to any one of claims (1) to (8) is installed.

(11) A system for controlling progress of a video game, the system comprising a communication network, a server, and a plurality of user terminals, the system comprising:
an obtaining section configured to obtain communication quality information regarding a communication quality of one of user terminals;
a determining section configured to determine a display condition of a character on the basis of the communication quality information; and
a displaying section configured to cause the one user terminal to display a game image based on the determined display condition.

(12) The system according to claim (11),
wherein the server includes the obtaining section, the determining section, and the displaying section, and
wherein each of the user terminals includes:
an outputting section configured to output the game image on a display screen of a display device included in the corresponding user terminal.

(13) A non-transitory computer-readable medium including a program product for causing a user terminal to realize functions to control progress of a video game,
wherein a server includes:
an obtaining function configured to obtain communication quality information regarding a communication quality of one of user terminals;
a determining function configured to determine a display condition of a character on the basis of the communication quality information; and
a displaying function configured to cause the one user terminal to display a game image based on the determined display condition, and
wherein the functions include:
a receiving function configured to receive information for outputting the game image from the server.

(14) A non-transitory computer-readable medium including a program product for causing a user terminal to realize functions to control progress of a video game,
wherein the functions include:
an obtaining function configured to obtain communication quality information regarding a communication quality of the user terminal;
a determining function configured to determine a display condition of a character on the basis of the communication quality information; and
a displaying function configured to cause the user terminal to display a game image based on the determined display condition.

(15) A non-transitory computer-readable medium including a program product for causing a server to realize at least one function of the functions that the program product described in claim (14) causes the user terminal to realize, the server being capable of communicating with the user terminal.

(16) A user terminal into which the program product contained in the non-transitory computer-readable medium according to claim (14) or (15) is installed.

(17) A method of controlling progress of a video game, the method comprising:
an obtaining process configured to obtain communication quality information regarding a communication quality of one of user terminals;
a determining process configured to determine a display condition of a character on the basis of the communication quality information; and
a displaying process configured to cause the one user terminal to display a game image based on the determined display condition.

(18) A method of controlling progress of a video game by a system, the system comprising a communication network, a server, and a plurality of user terminals, the method comprising:
an obtaining process configured to obtain communication quality information regarding a communication quality of one of user terminals;
a determining process configured to determine a display condition of a character on the basis of the communication quality information; and
a displaying process configured to cause the one user terminal to display a game image based on the determined display condition.

According to one of the embodiments of the present invention, it is useful to provide a video game in which a comfortable operation can be maintained easily.

What is claimed is:

1. A non-transitory computer-readable medium including a program product for causing a server to perform operations to control progress of a video game,
wherein the operations include:
obtaining communication quality information regarding a communication quality of at least one user terminal;
determining a display condition on the basis of the communication quality information, the display condition including a number of characters displayed in a game image; and
displaying, on a display screen of a display device of the at least one user terminal, the game image on the basis of the determined display condition.

2. The non-transitory computer-readable medium according to claim 1,
wherein the display condition including the number of characters being equal to or less than a maximum number of characters.

3. The non-transitory computer-readable medium according to claim 1,
wherein the operations further include:
determining a condition regarding a relationship with a user who operates the at least one user terminal,
selecting a character that satisfies the determined condition regarding the relationship with the user, and
displaying, on the display screen of the display device of the at least one user terminal, the game image such that the character selected by the selecting is drawn.

4. The non-transitory computer-readable medium according to claim 1,
wherein the determining includes determining a condition regarding a display mode of an action of a character as the display condition, and
wherein the displaying includes displaying, on the display screen of the display device of the at least one user terminal, the game image on the basis of the determined condition regarding the display mode of the action of the character.

5. The non-transitory computer-readable medium according to claim 1,
wherein the operations further include:
selecting a first character that is displayed and a second character that is not displayed on the basis of a predetermined priority condition when the number of characters, which exist within a range that is displayed in one virtual space as the game image, does not satisfy the determined condition regarding the number of characters.

6. The non-transitory computer-readable medium according to claim 5,
wherein the selecting includes selecting a character as the first character on the basis of a condition that a character near a character, which is an operational target of a user who operates the at least one user terminal, is preferentially displayed, as the predetermined priority condition.

7. The non-transitory computer-readable medium according to claim 5,
wherein the selecting includes selecting a character as the first character on the basis of a condition that a character near a center position of the range that is displayed in the one virtual space as the game image is preferentially displayed, as the predetermined priority condition.

8. The non-transitory computer-readable medium according to claim 1, wherein the displaying includes displaying, on the display screen of the display device of the at least one user terminal, a game image when a character that satisfies a predetermined relationship with a user who operates the at least one user terminal is included in characters that exist within a range that is displayed in one virtual space as the game image and the character is not drawn in the game image on the basis of the determined display condition, the character that satisfies the predetermined relationship with the user being drawn in the game image.

9. The non-transitory computer-readable medium according to claim 1, wherein the at least one user terminal is capable of communicating with the server.

10. A server into which the program product contained in the non-transitory computer-readable medium according to claim 1 is installed.

11. A system for controlling progress of a video game, the system comprising a communication network, a server, and a plurality of user terminals, the system comprising:
obtaining communication quality information regarding a communication quality of at least one user terminal;
determining a display condition on the basis of the communication quality information, the display condition including a number of characters displayed in a game image; and
displaying, on a display screen of a display device of one of the plurality of one user terminals, the game image on the basis of the determined display condition.

12. A non-transitory computer-readable medium including a program product for causing a user terminal to perform operations to control progress of a video game,
wherein the operations include:
obtaining communication quality information regarding a communication quality of the at least one user terminal;
determining a display condition on the basis of the communication quality information, the display condition including a number of characters displayed in a game image; and
displaying, on a display screen of a display device of the one user terminal, the game image on the basis of the determined display condition.

* * * * *